Figure 1:
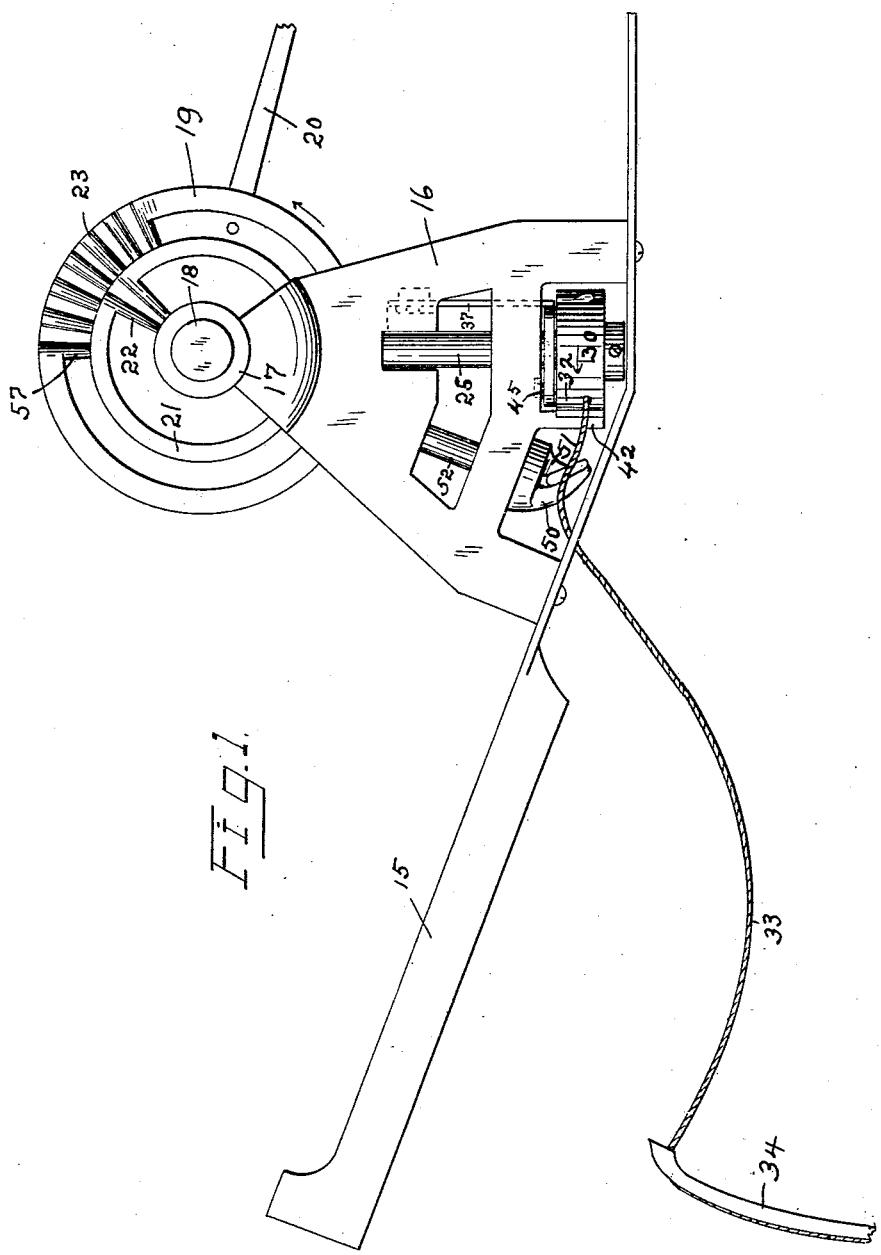

No. 745,941. PATENTED DEC. 1, 1903.
G. W. WHITTINGTON.
KNOTTER FOR GRAIN BINDERS.
APPLICATION FILED AUG. 28, 1902.
NO MODEL. 4 SHEETS—SHEET 1.

WITNESSES: INVENTOR
W. L. Bushong. George W. Whittington
Nellie Allemong. BY
D. H. Lockwood
ATTORNEY

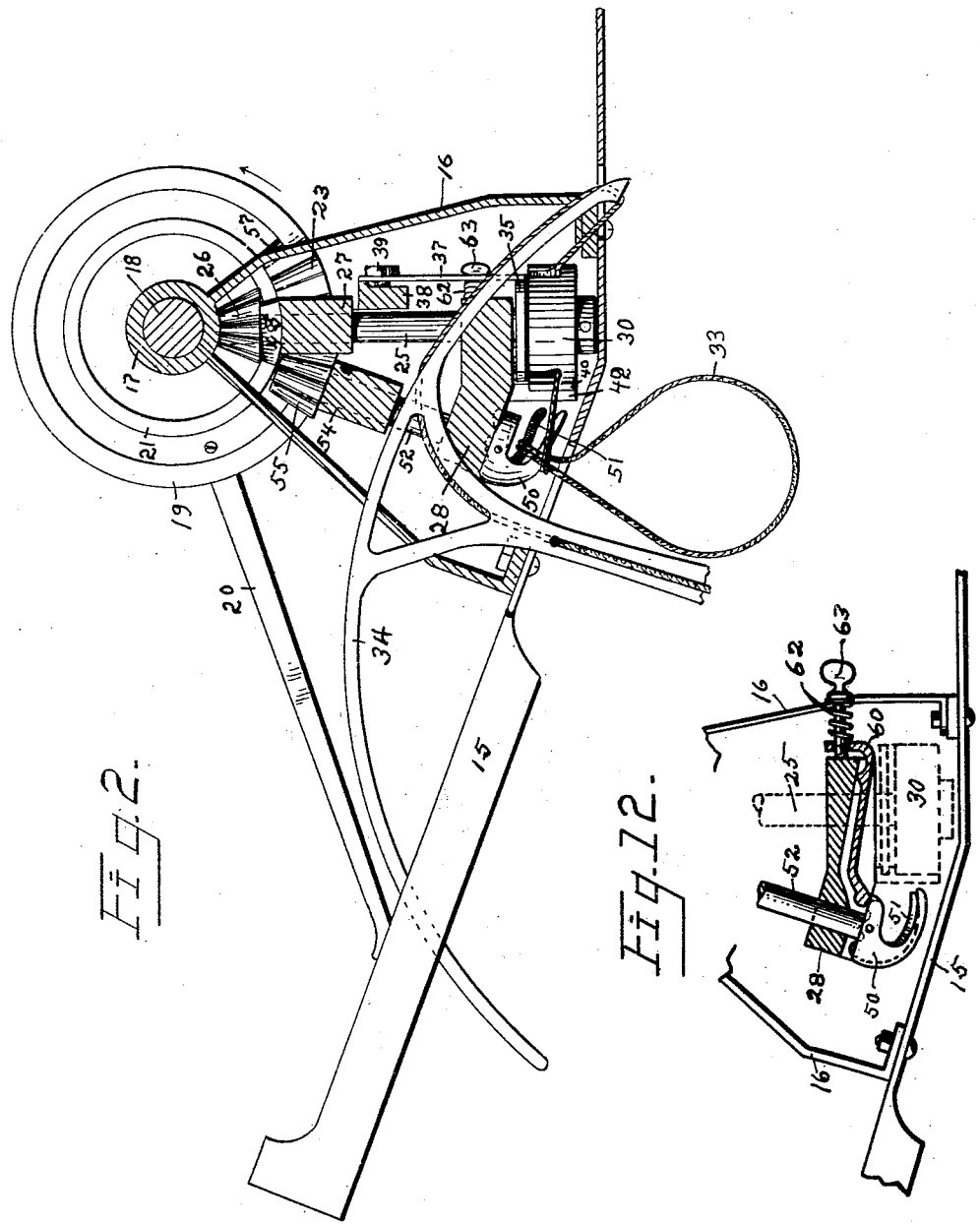

No. 745,941. PATENTED DEC. 1, 1903.
G. W. WHITTINGTON.
KNOTTER FOR GRAIN BINDERS.
APPLICATION FILED AUG. 28, 1902.
NO MODEL. 4 SHEETS—SHEET 3.
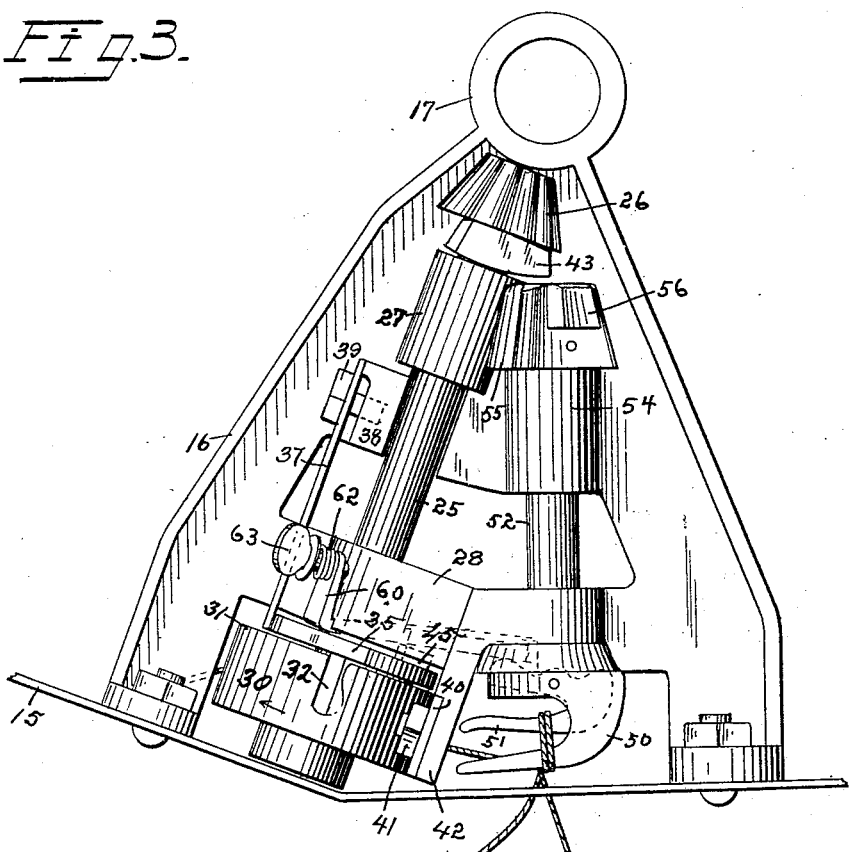
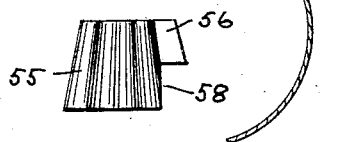
WITNESSES:
INVENTOR
George W. Whittington.
BY
V. H. Lockwood.
ATTORNEY No. 745,941. PATENTED DEC. 1, 1903.
G. W. WHITTINGTON.
KNOTTER FOR GRAIN BINDERS.
APPLICATION FILED AUG. 28, 1902.
NO MODEL. 4 SHEETS—SHEET 4.
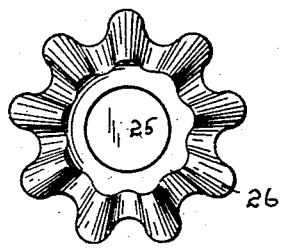
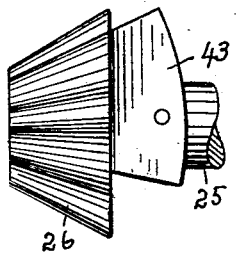
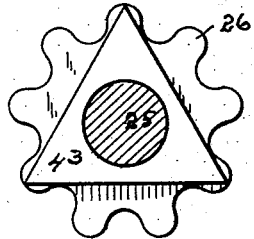
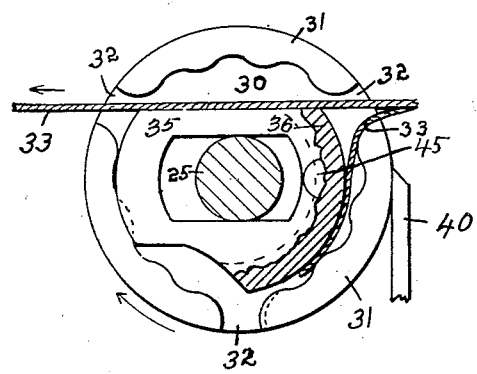
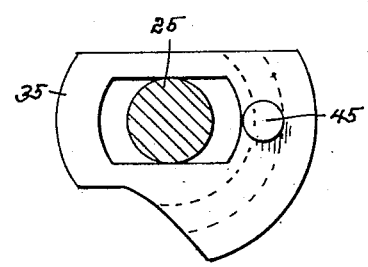
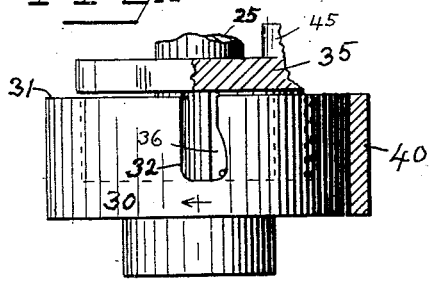
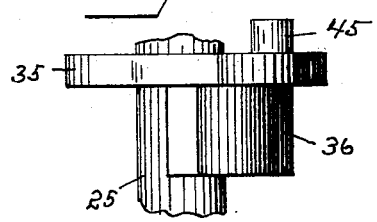
WITNESSES:
W. L. Bushong.
Nellie Allemong.
INVENTOR
George W. Whittington
BY
V. H. Lockwood
ATTORNEY
THE NORRIS PETERS CO., PHOTO-LITHO., WASHINGTON, D. C.

No. 745,941. Patented December 1, 1903.

UNITED STATES PATENT OFFICE.

GEORGE W. WHITTINGTON, OF INDIANAPOLIS, INDIANA, ASSIGNOR OF TWO-THIRDS TO ALFRED D. LOFLAND, OF CRAWFORDSVILLE, INDIANA, AND JOHN S. LOFLAND, JR., AND ANNA LOFLAND, OF ROMNEY, INDIANA.

KNOTTER FOR GRAIN-BINDERS.

SPECIFICATION forming part of Letters Patent No. 745,941, dated December 1, 1903.

Application filed August 28, 1902. Serial No. 121,395. (No model.)

*To all whom it may concern:*

Be it known that I, GEORGE W. WHITTINGTON, of Indianapolis, county of Marion, and State of Indiana, have invented a certain new and useful Knotter for Grain-Binders; and I do hereby declare that the following is a full, clear, and exact description thereof, reference being had to the accompanying drawings, in which like figures refer to like parts.

The object of my present invention is to simplify and cheapen the construction of knotting-machines.

The nature of this invention will be understood from the accompanying drawings and the following description and claims.

In the drawings, Figure 1 is a side elevation of the knotter with the twine and parts in their position after a bundle has been bound and ready for binding another bundle. Fig. 2 is the same view with the parts in position while the knot is being tied, parts being in vertical section. Fig. 3 is an elevation of the opposite side of parts shown in Fig. 2, the parts being in the same stage of operation and on a larger scale than what is shown in Fig. 2 and tipped somewhat to the right. Fig. 4 is a side elevation of a segmental bevel-gear that actuates the knotter-hook. Fig. 5 is a plan view of the bevel-gear and shaft that actuates the cord-holding disk. Fig. 6 is a side elevation of the same with the shaft broken away. Fig. 7 is a bottom view of what is shown in Fig. 5 with the shaft in section. Fig. 8 is a plan view of the cord-holding disk with parts in section. Fig. 9 is a plan view of the cord-clamping disk, one of the shafts being in section. Fig. 10 is a side elevation of the cord-holding disk with the knife in section and parts broken away. Fig. 11 is a side elevation of what is shown in Fig. 9, the shaft being broken away. Fig. 12 is a vertical section through part of the machine, showing the means for operating the bill-hook.

In detail, 15 represents the breast-plate on which the knotter mechanism is secured.

16 is a frame secured to the breast-plate in which the parts of the knotter are mounted. At its upper end it is provided with a bearing 17, in which the shaft 18 is mounted, that carries the tier-wheel 19. The latter has secured to it the ejecting-arm 20. Said wheel 19 has a central thickened portion 21, in which the radial teeth 22 are placed, and outside of such portion 21 there are radial teeth 23. The tier-wheel drives the cord-holder shaft 25 by means of the teeth 22 engaging the bevel-gear 26 on the upper end of the cord-holder shaft. The cord-holder shaft is vertical and at its upper end is mounted in the projection 27 from the frame 16 and at its lower end in a projecting plate 28 from said frame 16. Said shaft 25 at its lower end carries the cord-holding disk 30. The cord-holding disk operates horizontally. Its construction is shown in Figs. 8 to 11. The bottom or under side is closed in the form of a plane disk. On its upper side, extending upward from it near its periphery, there are three rib-like upward extensions 31. There are three of these ribs 31 of about the same length arranged equidistantly apart, as shown in Fig. 8; but between them the vertical slot or space 32 is left, as shown in Figs. 8 and 10. The cord 33 rests upon the disk and extends through two of the vertical slots 32—that is, between one of the segmental ribs 31 on the one side and the other two ribs on the other side. The cord extends around the bundle in a loop, as shown in Figs. 2, 3, and 8, and returning extends through the slot 32 that it issued from and then toward the third slot 32, as shown in Figs. 8 and 10. The cord is held at one end by the needle 34 and after looping around the bundle is held at the other end against one of the ribs 31 by the cord-clamping plate 35, as appears plainly in Fig. 8. This plate 35 has a downwardly-extending rib 36 (shown in section in Fig. 8 and in Fig. 11) to press the cord against the rib 31. This pressing or clamping is caused by the spring 37, (seen in Fig. 2,) which is fastened at its upper end to the lug 38 by the nut 39. The position of this frame is shown clearly in Fig. 3. It forces the plate 35 and rib 36 over against the rib 31, because the plate 35 is centrally cut out, so as to leave an elongated slot through which the shaft 25 extends. This enables it to adapt itself to cords of varying thickness. The clamping-plate 35 is held from rotating with the shaft 25 and the cord-holding disk by the lug 45, extending upward into an elongated slot (shown in dotted lines) in the extension 28 of the frame. The clamping-disk 35 on its clamping side therefore extends over the cord-holding disk, as shown in Fig. 10, as well as in Figs. 1, 2, and 3, to prevent any foreign substance getting between the clamping-rib 36 and the rib 31 on the cord-holding disk. On one side the clamping-plate 35 is cut in a straight line to allow the cord 33 to lie straight across the cord-holding disk, as shown in Fig. 8. The cord is cut after the bundle is tied by the knife 40, as seen in Figs. 8 and 10. In Fig. 3 it is seen that the knife is secured by the nut 41 to the arm 42, extending downward from the extension 28 of the frame. As shown in Fig. 8, the cutting edge of the knife rests against the periphery of the cord-holding disk, so that it cuts the cord as the disk is rotated in the direction of the arrow.

The cord-holding disk and shaft 25 are actuated through the bevel-gear 26. (Shown in Figs. 5, 6, and 7.) Below this bevel-gear 26 there is a triangular block 43, secured to the shaft 25, with three plane faces, as seen in Fig. 7, that rests against the rim 21 of the tier-wheel 19 and prevents the rotation of the shaft 25 excepting when the teeth 22 engage one of the teeth of the bevel-gear 26 that is directly above and corresponds with the point of the triangular block. The result is that each revolution of the tier-wheel revolves the shaft one-third of a revolution.

The knotter-hook 50 and the bill-hook 51 are constructed the same as shown in my former Letters Patent, No. 567,627, issued September 15, 1896. The bill-hook is pivoted to the head of the knotter-hook, and the latter is secured to the knotter-hook shaft 52, which is mounted at its lower end in the extension 28 of the frame and at its upper end in the extension 54 of the frame. It is driven by the bevel-gear 55, secured on the upper end, that meshes with the teeth 23 on the tier-wheel. The form of the bevel-gear 55 is shown in Figs. 3 and 4. That bevel-gear has a peculiarly-shaped tooth 56, that extends into the space between the rim 21 of the tier-wheel and the outer rim and engages the first tooth 57 of the series of teeth 23, that first tooth being short, as shown, and that enables the tier-wheel to start the bevel-gear 55 to operating. After the teeth 23 on the tier-wheel have cleared the bevel-gear 55 the flat surface 58 of the bevel-gear will bear against the outer rib of the tier-wheel 19 and prevent the further rotation of the knotter-hook until the teeth 23 come around again, so that the rotation of the tier-wheel rotates the knotter-hook once.

It is observed that the cord-holding disk has the three ribs 31 extending up from it equal in length and equidistant from each other, so that that disk is turned only one-third of a rotation each time the knotter-hook is turned once and near the end of the rotation of the knotter-hook, as shown by the arrangement in Fig. 2. Therefore the knot is tied by the knotter-hook before the cord-holding disk in its one-third rotation brings the cord against the knife to cut it. The bill-hook is actuated by the lever 60, bearing upon a cam-surface on the shank of the bill-hook 51, as explained in my former patent referred to and as appears in Figs. 3 and 12. The lever 60 is angular, with the long end extending through an opening in the casting 28, and at its bend bears upward against the under edge of said casting and is controlled by the spring 62 on the bolt 63, which is secured to the casting 28. The spring 62 tends to hold down the inner or free end of the lever 60 upon the shank of the bill-hook. No further explanation of this is needed in view of the description of the same thing in my former patent.

The operation will be understood from the following description: Assuming the parts to be as shown in Fig. 1 just after a bundle has been ejected, the tier-wheel moves in the direction of the arrow. The end of the cord is clamped in the cord-holding disk, as shown in Figs. 1 and 8, and then the grain is fed in upon the twine above the needle-point, as shown in Fig. 1, until sufficient has accumulated for a bundle, and then the needle is elevated and moved from the position shown in Fig. 1 to the position shown in Fig. 2, the loop of the twine or cord surrounding the bundle. The needle carries the cord across the cord-holding disk in the direction indicated by the arrow in Fig. 8 and holds it down on the disk in the position there shown and as shown in Fig. 2. At that stage both ends of the cord are in the position shown in Fig. 8. Just previous to that the knotter-hook has been started in its rotation to form the knot, as shown in Fig. 2, and this continues until the knot is formed and the knotter-hook has almost reached the end of its rotation, when the cord-holding disk begins to rotate and the knife severs the twine, leaving the end of the twine clamped in the cord-holding disk, as shown in Fig. 1, and then the needle resets in the position shown in that figure, ready to receive another bundle.

What I claim as my invention, and desire to secure by Letters Patent, is—

1. In a knotter for grain-binders, a rotary cord-holding disk having a vertically-extending flange or rib, a vertical shaft on which said disk is secured, a clamping-plate mounted over said disk and surrounding said shaft that is laterally movable against the inner surface of the flange or rib of the disk, and means for moving said plate against said flange or rib for holding the cord.

2. In a knotter for self-binders, a cord-holding disk having an upwardly-extending flange or rib, a clamping-plate above the cord-holding disk with a downwardly-extending flange or rib between the flange or rib on the cord-holding disk and the center of the disk, and means for moving the clamping-plate laterally to bring the flange or rib on said plate against the flange or rib on the cord-holding disk for holding the cord between said flanges or ribs.

3. In a knotter for self-binders, a rotatory cord-holding disk having a plurality of vertically-extending flanges or ribs disposed along the periphery of said disk and having a slot or space between their adjacent ends, a laterally-movable clamping-plate with a rib or flange along one side extending down between the center of the disk and the ribs thereon for engaging one rib or flange on the cord-holding disk and clamping the cord between said ribs or flanges, and said clamping-plate being cut away along the side opposite the other rib or flange on the cord-holding disk to enable the cord to be passed across said disk between the clamping-plate and one of the flanges or ribs on said disk.

4. In a knotter for self-binders, a rotatory cord-holding disk having three upwardly-extending flanges or ribs disposed along the periphery of said disks with spaces or slots between their adjacent ends, a non-rotatable clamping-plate mounted above the disk with a downwardly-extending flange or rib adapted to be parallel with one of the ribs or flanges on the disk and between the center of the disk and the ribs or flanges thereon, and said clamping-plate being cut away along one side opposite another one of the flanges or ribs on said disk, and a spring for moving said clamping-plate laterally for holding the cord.

In witness whereof I have hereunto affixed my signature in the presence of the witnesses herein named.

GEORGE W. WHITTINGTON.

Witnesses:
V. H. LOCKWOOD,
NELLIE ALLEMONY.